UNITED STATES PATENT OFFICE.

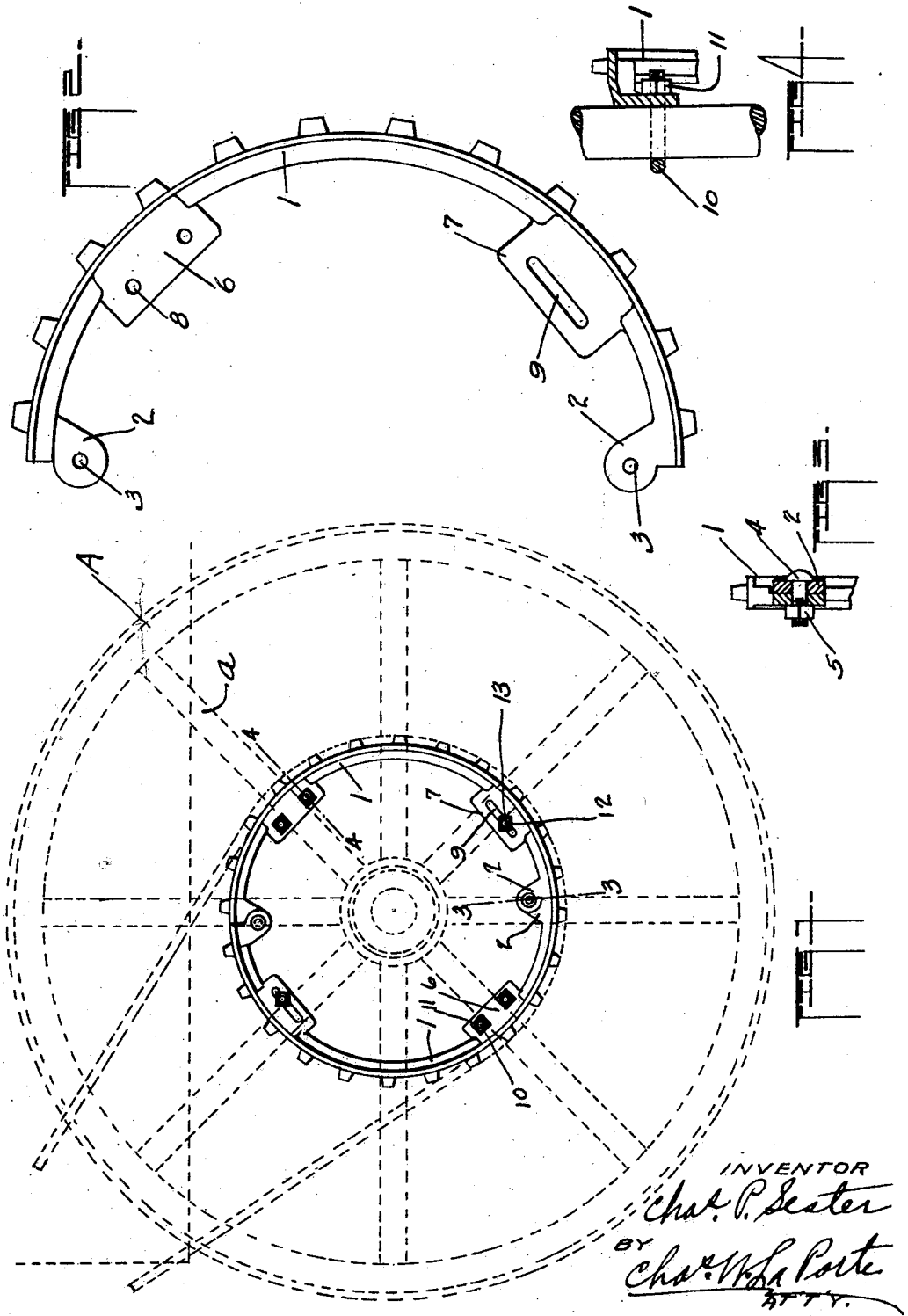

CHARLES P. SESTER, OF PEORIA, ILLINOIS.

SPROCKET WHEELS.

1,409,594.　　　　Specification of Letters Patent.　　Patented Mar. 14, 1922.

Application filed July 16, 1920. Serial No. 396,647.

*To all whom it may concern:*

Be it known that I, CHARLES P. SESTER, a citizen of the United States, a resident of Peoria, in the county of Peoria and State of Illinois, have invented new and useful Improvements in Sprocket Wheels, of which the following is a specification.

This invention has reference to sprocket wheels, and it has for its principal object to improve that type of sprocket wheel used to transmit power from the rear wheel of a wagon to the operating mechanism of an end-gate seeding machine attached to the wagon.

The most commonly used sprocket wheel for the purposes mentioned, is a wheel attachable to the wagon side of the spokes of the wagon wheel, and it is necessary to remove the wagon wheel when attaching and detaching the sprocket wheel. This is done each time the end-gate seeding machine is used, and presents an inconvenient drive for the seeding machine elements. Further, cramping of the wagon wheel very often cracks the sprocket wheel, making it necessary for the farmer to send to the manufacturer for an entire new sprocket wheel. This is costly, because the sprocket wheel is of large size and castings of this character have increased considerably in cost.

My invention aims to do away with the necessity of removing the wagon wheel when attaching and detaching the sprocket wheel, thus saving time and labor; and further the sprocket wheel is made in two attachable sections, duplicates of each other and made from the same pattern, therefore, when a section breaks or is cracked the farmer is only put to the cost of furnishing a one-half section, thus materially decreasing the cost of repairs to his outfit.

That the invention may be more fully understood, reference is had to the accompanying drawings, forming a part of the description, illustrating a preferred embodiment of the invention, in which—

Figure 1 is a side elevation of a sprocket wheel embodying my improvements, looking at the wheel from the wagon side, the wagon wheel shown in dotted lines;

Figure 2 is a side elevation of one of the duplicate sections of the sprocket wheel;

Figure 3 is a cross-section as the same would appear if taken on the line 3—3, Figure 1, and Figure 4 is a cross-section as the same would appear if taken on the line 4—4 Figure 1.

Like characters of reference denote corresponding parts throughout the figures.

My improved sprocket wheel includes the duplicate semi-spherical ring like sections 1, 1, minus hub and spoke members, by reason of the fact that the said sections when joined to constitute the complete sprocket wheel, are attached to the spokes *a* of a wagon wheel A. The terminals of each section are preferably formed with inwardly and forwardly extending ears or plates 2, having openings 3 therethrough to receive bolts 4 engaged by nuts 5 for securing the terminals of the complementary sections together. Each section 1 is further formed or provided with the flanged radially arranged extension plates 6 and 7. The former are provided with a pair of bolt openings 8 and the latter are slotted, as at 9.

When it is desired to attach my improved sprocket wheel to a wagon wheel, the two sections 1, 1 are passed around the hub and axle of the wagon wheel, next the wagon body, and the ears or plates 2 united by means of the bolts 4 and nuts 5 in manner shown in Figure 1. The plates 6 of the sections 1, 1 which are now diametrically opposed, are secured to spokes *a* by means of U bolts 10 passed around the spokes, through the openings 8 in the plates 6 and secured in place by nuts 11. The slotted plates 7, which are also diametrically opposed, are intended to be bolted to other oppositely disposed spokes *a*, and the slots 9 are provided so that hooks 12 which clamp the spokes may be passed through the slots 9 in the plates 7 and nuts 13 secure the hooks in place. Providing the slots 9 and the hooks 12, will take care of any irregularity of the spokes, and give the necessary play so that attachment of the sections 1 may be assured in a very secure manner.

What I claim is:—

1. A driving sprocket wheel attachable to a wagon wheel, comprising duplicate semi-circular ring-like sections, the terminals of each section formed with inwardly and forwardly extending ears, means to connect the ears of the two sections, and means to attach the said sections to the spokes of a wagon wheel.

2. An article of manufacture, comprising a semi-circular ring-like section provided with sprocket teeth on its periphery, and its terminals formed with inwardly and forwardly extending ears having bolt openings therethrough.

3. An article of manufacture, comprising an invertible semi-circular ring-like section provided with sprocket teeth on its periphery, and its terminal ends provided with bolt receiving members which are adapted to have a complementary relation with members on the opposite ends of a similar section when brought together to constitute a complete sprocket wheel.

4. A driving sprocket wheel adapted for attachment to the inside face of a wagon wheel, comprising duplicate semi-circular sections having an inverted relation when united, the terminals of each section formed with members which, when the sections are in abutting relation lie in juxtaposition to each other, means to connect the said members, spaced plates on said sections, one having bolt openings, and the other a slot, and clamping bolts engageable with said plates to attach the wheel to the spokes of a wagon wheel.

In witness whereof, I have hereunto affixed my hand this 6th day of July, 1920.

CHARLES P. SESTER.